Feb. 7, 1933.                S. JEPSEN                1,896,628
                       LUGGAGE CARRIER FOR VEHICLES
                       Filed Oct. 26, 1929        2 Sheets-Sheet 1
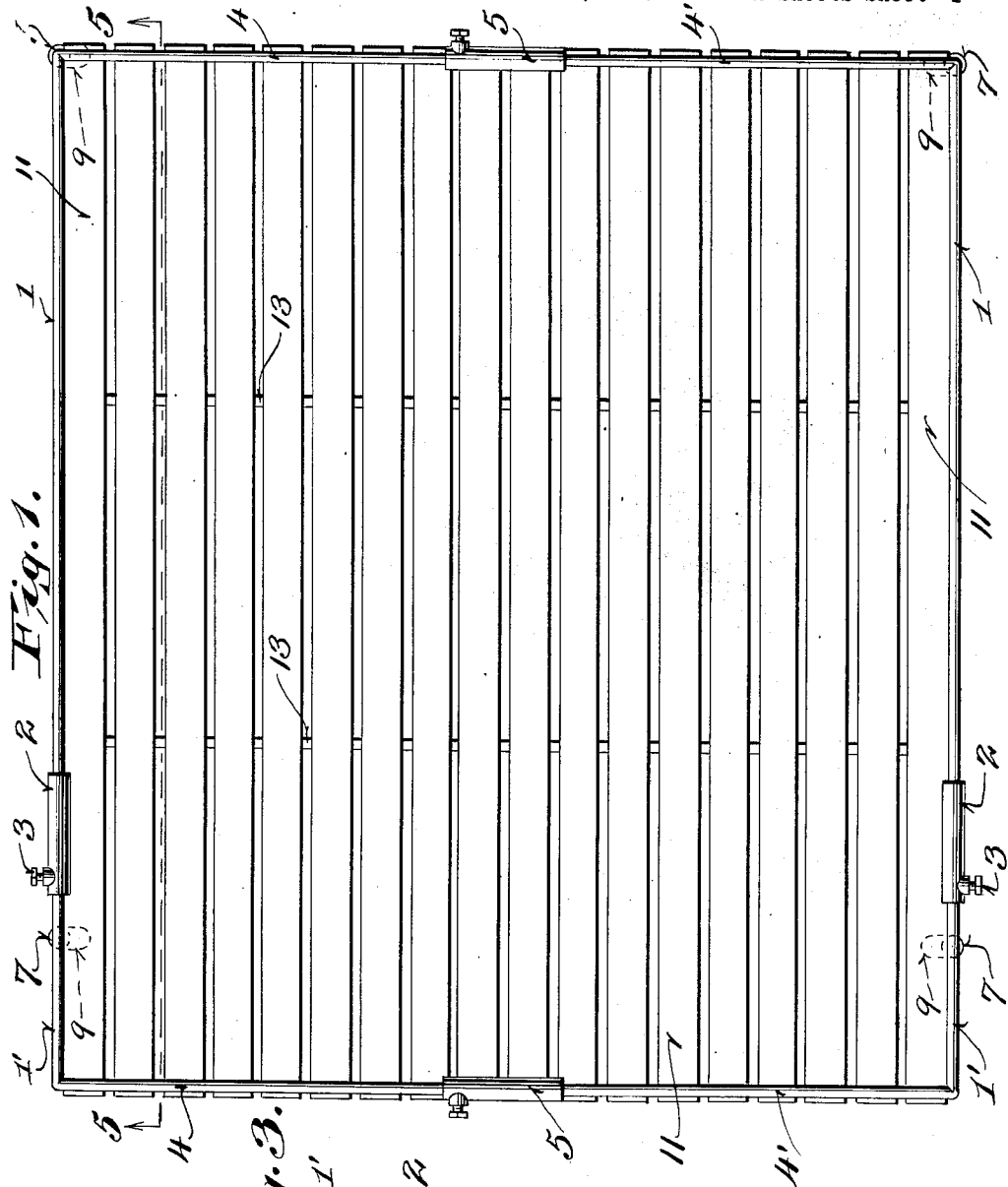
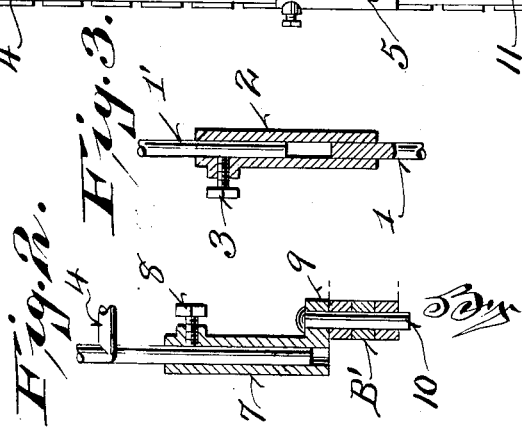

Feb. 7, 1933. S. JEPSEN 1,896,628
LUGGAGE CARRIER FOR VEHICLES
Filed Oct. 26, 1929 2 Sheets-Sheet 2
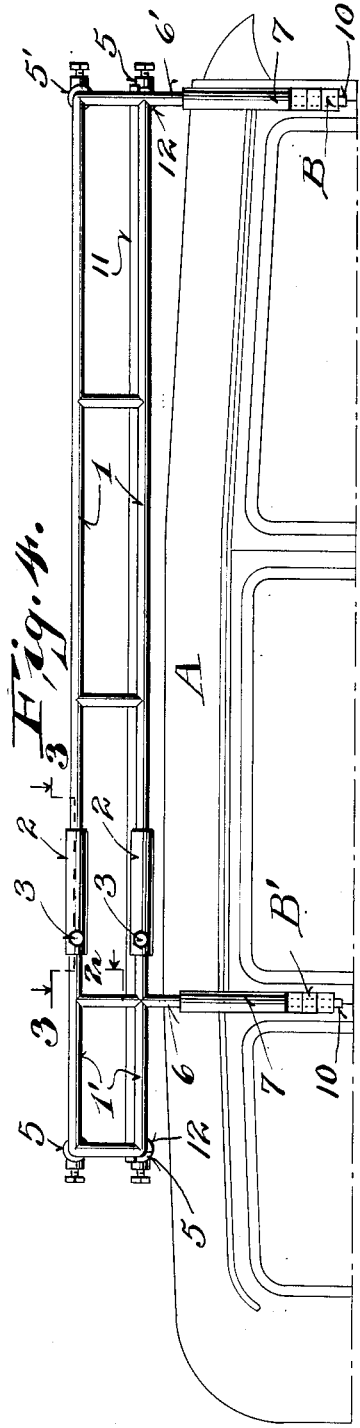
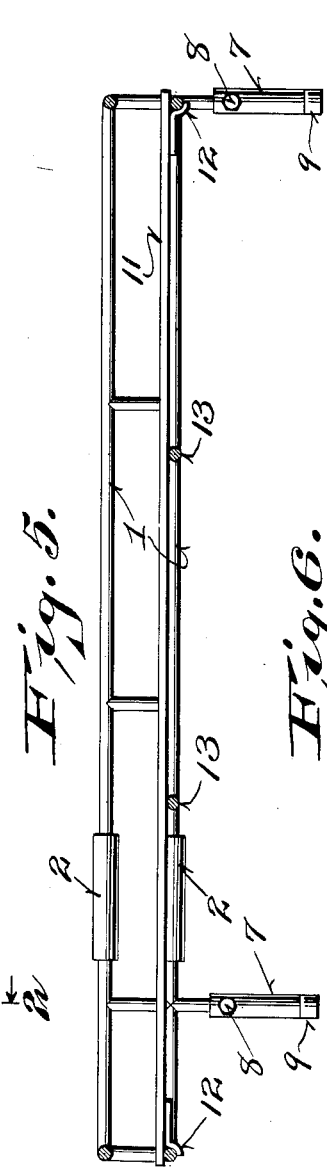
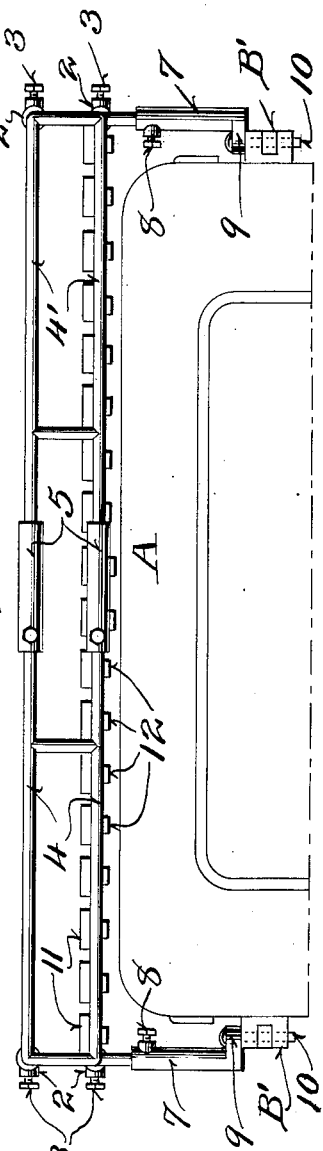
Inventor
S. Jepsen Patented Feb. 7, 1933

1,896,628

UNITED STATES PATENT OFFICE

SOPHUS JEPSEN, OF RACINE, WISCONSIN

LUGGAGE CARRIER FOR VEHICLES

Application filed October 26, 1929. Serial No. 402,705.

My invention refers to luggage carriers for vehicles and particularly to the canopy type. Heretofore, luggage carriers associated with a top of a closed automobile have been mounted in various ways to support the load, whereby the load strain is usually distributed directly upon the top of the vehicle, which frequently results in damaging the same, and furthermore such structures require various special fittings which must be associated with the vehicle for the support of the luggage carrier.

It is obvious from past experience that an overhead or canopy type is the most desirable manner in which to take care of the load, whereby said load may be properly distributed so as to produce an even balance.

My invention, therefore, contemplates broadly the production of a luggage carrier of the canopy or overhead type which is so arranged and constructed that it can be readily attached to the door hinges of any standard closed car or vehicle. A further object of my invention is to provide means for adjusting the carrier to meet the various dimensions between the doors of standard vehicles.

The invention also contemplates an arrangement whereby the luggage carrier can be quickly attached to the front and rear door hinges of any standard vehicle without screws or other fastenings which would necessitate the employment of a skilled workman.

With the above and other objects in view, my invention, therefore, consists in certain peculiarities of construction and combination of parts as will be hereinafter fully set forth with reference to the accompanying drawings and subsequent claims.

In the drawings, Figure 1 represents a plan view of a luggage carrier embodying the features of my invention.

Figure 2 is an enlarged detailed section fragmentary view of the luggage carrier attaching means associated with a standard hinge, the section being indicated by line 2—2 of Figure 4.

Figure 3 is an enlarged detailed sectional view, illustrating a telescopic joint means for adjusting the length or width of the luggage carrier, the section being indicated by line 3—3 of Figure 4.

Figure 4 is a side elevation of a luggage carrier, embodying the features of my invention, the same being shown mounted above the top of the vehicle and attached to the same by the upper hinges associated with the front and rear doors of the vehicle.

Figure 5 is a longitudinal sectional view of the same, the section being indicated by line 5—5 of Figure 1; and Figure 6 is an end elevation of the luggage carrier shown attached to the vehicle top.

Referring by character to the drawings, A represents the top portion of an automobile closed body having upper front door hinges B and rear upper door hinges B', as best shown in Figures 4 and 6 of the drawings.

The luggage carrier comprises parallel side rails 1 provided with suitable brace bars and short side rail section 1' similarly constructed. The side rail sections 1 and 1' are rendered adjustable with relation to each other for lengthening and shortening the frame by means of sleeves 2—2, which are braced or otherwise secured to the rails 1 and in telescopic union with the ends of the rails 1'.

When these parts are adjusted to the proper position with relation to the hinges B and B', they are secured by bolts 3—3 which pass through the sleeves 2 and impinge against the ends of the rails 1'.

The ends of the luggage frame are similarly constructed; that is, said ends comprise parallel rail members 4 and 4' which are connected by telescopic members 5—5 that are similar in construction to the telescopic joints just described in connection with the side rails. Hence, it will be observed that the width and length of the luggage carrier is provided with sufficient scope of adjustment to meet general conditions.

The side rails 1 and 1' are also provided with depending legs 6—6', which legs are shown in two parts. The lower tubular portion of the legs 7—7' are in telescopic union with the upper portions of said legs and locked in their adjusted position by set screws 8. The lower section 7 of the legs have inturned apertured toes 9, the apertures of which toes are adapted to be aligned with the pintle apertures of the door hinges B and B'.

When it is desired to place the carrier in position the original pintle bolts of the hinges are removed and after alignment of the bolt pintle apertures and the toe apertures, said pintles are replaced by pintles 10, which pintles are substituted for the original bolt pintles due to their extra length.

From the foregoing it will be understood that the entire load of the luggage, which may be mounted within the carrier, is now positively supported from the rigid upper hinges of the vehicle, whereby the load strain is evenly distributed and will not tend to rack or otherwise strain the body structure of said vehicle.

Furthermore, it will be noted that the floor of the carrier is built up from a series of flexible slats 11, which slats, as best shown in Figure 5 of the drawings, are frictionally held in place by end lugs 12 carried by the slats and engaging the lower front and rear rails of the carrier, and said slats are further supported by bottom cross rails 13 which connect the corresponding lower side rails of said carrier.

As heretofore stated, the carrier is adjustable both as to width and length within certain limits. The slats 11 are all independent of one another and are freely removable from the frame of the carrier. Thus, when the width of the frame is increased, an additional slat can be added, or the slats can be spread further apart. When the frame of the carrier is made narrower, one or more of the slats can be removed. When the active length of the carrier is changed, shorter or longer slats can be employed as needed.

Hence, by referring to Figure 4 of the drawings, it will be noted that the carrier and its floor is all positioned clear of the vehicle top structure, whereby no strain is placed upon the top of said vehicle, and, furthermore, the side strain or sway is taken away due to the metallic anchorage relation of the carrier to the door hinge members.

It will further be observed that the structure, as a whole, can be readily and quickly mounted in its position above the top of the vehicle by anyone unskilled in the art and that it can be further quickly adjusted as to length and breadth to meet the various dimensions between the hinge anchorage points of the vehicle to which it is desired to be attached.

In some instances the carrier may be so constructed as to permit its attachment to what is termed a two-door car, in which case one end of the carrier may be suitably braced from the lower structure of the vehicle.

While I have shown and described one simple exemplification of my invention in all of its detail, it is manifest that I may vary the structural features of the invention aside from that which is specifically shown in the drawings without departing from the spirit of the claims, and obviously the materials and dimensions, with respect to the carrier, may be indefinitely varied.

Furthermore, in instances where the carrier is to be what might be termed a built-in structure for a certain standard car, the adjustable features may be dispensed with.

I claim:

1. A luggage carrier for the roofs of automobiles comprising a frame including adjustable side rails and adjustable connecting end rails, whereby the width and length of the frame can be varied, removable and independent slats for the bottom of the carrier, means carried by the terminals of the slats for gripping certain of said rails, and means for securing the frame to an automobile.

2. The combination with an automobile having a body, doors for the body, hinges connecting the doors to the body including hinge leaves and removable pintles, of a luggage carrier for the roof of an automobile including a supporting frame having depending legs, supporting brackets having vertically disposed sockets for receiving the legs and offset collars for engaging the tops of the hinges, the hinge pintles being inserted through the collars and the leaves.

In testimony that I claim the foregoing I have hereunto set my hand at Racine, in the county of Racine and State of Wisconsin.

SOPHUS JEPSEN.